DONALD W. RUBY
EMANUEL SAUDINAITIS
*INVENTORS.*
BY John J. Pederson
THEIR ATTORNEY.

May 27, 1958 D. W. RUBY ET AL 2,836,762

VERTICAL SIZE COMPENSATION

Filed Sept. 2, 1955 2 Sheets-Sheet 2

DONALD W. RUBY
EMANUEL SAUDINAITIS
*INVENTORS.*

BY John J. Pederson

THEIR ATTORNEY.

2,836,762

VERTICAL SIZE COMPENSATION

Donald W. Ruby, Maywood, and Emanuel Saudinaitis, Chicago, Ill., assignors to Zenith Radio Corporation, a corporation of Illinois Application September 2, 1955, Serial No. 532,197

6 Claims. (Cl. 315—22)

Figure 1:
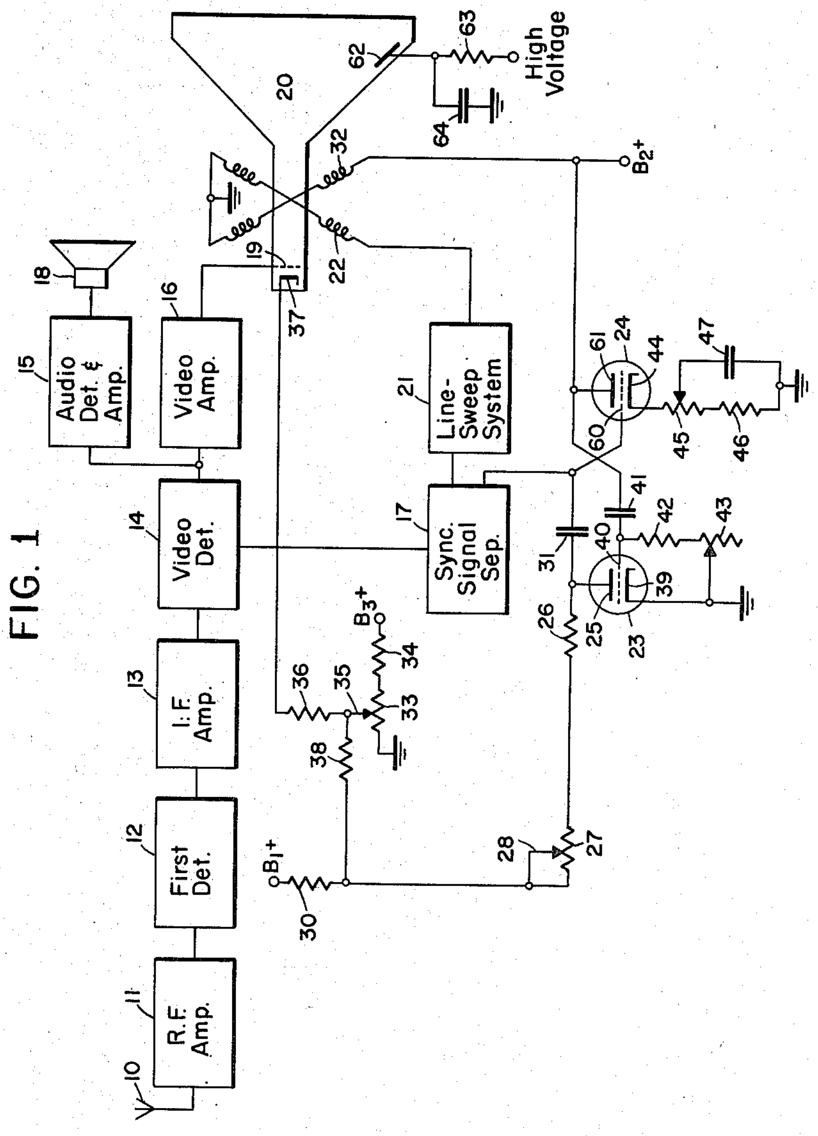

This invention relates to wave-signal receivers and more particularly to television receivers incorporating circuits compensating for changes in picture size with brightness variations.

In commercial television receivers it is common to employ a brightness control circuit which comprises a variable resistor or potentiometer connected between the cathode of the cathode-ray tube and a source of reference potential. The control grid of the cathode-ray tube is normally maintained at a fixed bias potential; variations in the brightness control setting change the effective bias potential difference between the cathode and the control grid. To increase brightness, the bias is reduced, thus permitting more electrons to leave the cathode and be accelerated toward the fluorescent screen. As this current flow increases, the number of electrons striking the final anode also increases; this additional current flow through the impedance connected between the final anode and the high voltage source, and reduces the D.-C. potential at the final anode. This reduction in potential decreases the acceleration imparted to the electrons by the final anode, causing the beam to be slower, or "softer," as it passes the deflection fields. The softer beam is deflected more than a stiffer beam by the deflection coils, giving an increase in picture size with an increase in brightness. The converse is likewise true; a decrease in brightness effects a decrease in picture size.

It is an object of this invention to effect compensation for the picture size fluctuations of a television receiver caused by variations of the brightness control.

A television receiver constructed in accordance with the invention comprises a cathode-ray tube which includes a fluorescent screen, an electron gun for projecting an electron beam toward the screen, means in the electron gun for varying the instantaneous intensity of the electron beam in accordance with an applied video signal, a deflection system responsive to an applied deflection signal to cause the beam to scan the fluorescent screen, and a final anode for determining the impact velocity of the beam on the screen. The receiver also includes means comprising a series coupling impedance for impressing a predetermined positive operating potential on the final anode, a deflection-signal generator coupled to the deflection system for impressing thereon a deflection signal to cause the beam to scan the screen in a co-ordinate direction with a predetermined nominal amplitude, and means including a variable brightness-control circuit coupled to the electron gun for controlling the average intensity of the beam, variation of the brightness-control circuit resulting in corresponding variations in the voltage drop across the series coupling imepdance and in the scanning amplitude of the beam in the co-ordinate direction. The receiver further includes means coupling the brightness-control circuit to the deflection signal generator to vary the deflection signal amplitude concomitantly with the voltage drop and maintain the scanning amplitude substantially constant with variation of the brightness-control circuit.

Figure 2:
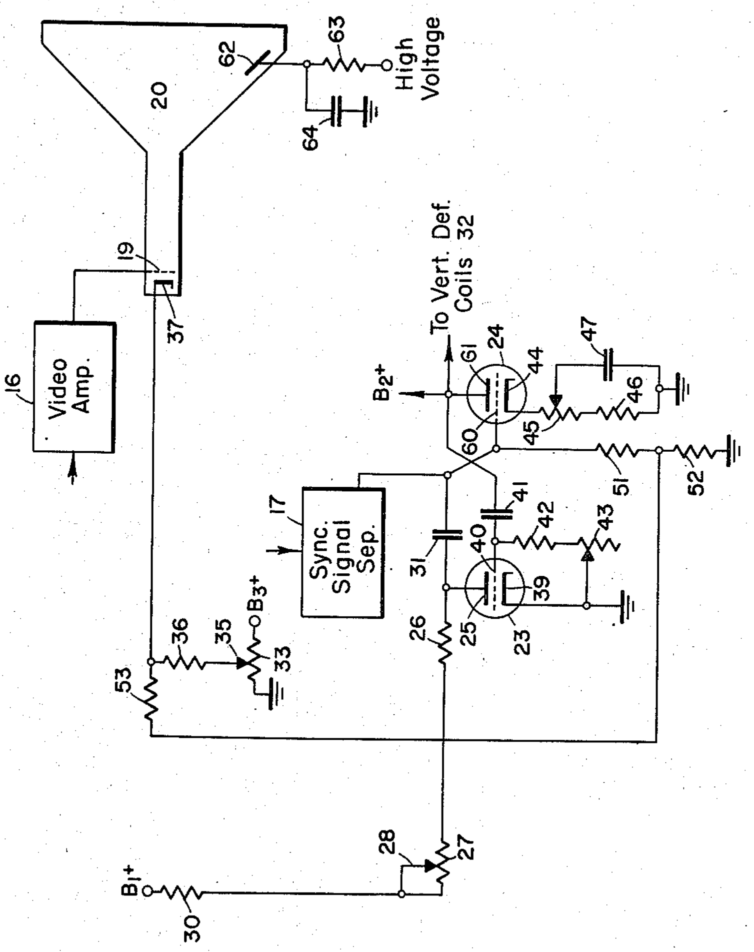

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements and in which:

Figure 1 is a schematic diagram, partly in block form, of an embodiment of the invention; and Figure 2 is a schematic diagram, partly in block form, of another embodiment of the invention.

Figure 1 shows a television receiver in which an antenna 10 is connected to a radio-frequency amplifier 11. The output terminal of R.-F. amplifier 11 is connected through a first detector 12 to an intermediate-frequency amplifier 13, which in turn is connected to a video detector 14. The output circuit of video detector 14 is connected to audio detector and amplifier 15, video amplifier 16, and sync signal separator 17. Audio detector and amplifier 15 is connected to loudspeaker 18, and video amplifier 16 is connected to the control grid 19 of a cathode-ray tube 20. Sync signal separator 17 is connected to a line-sweep system 21, the output of which is connected to the line-deflection coils 22 associated with cathode-ray tube 20.

The field-sweep system comprises a vertical oscillator stage 23 and a vertical output stage 24; these two stages may be connected as a multivibrator circuit, having its frequency regulated by periodic pulses coupled from sync signal separator 17. Cathode 39 of vertical oscillator 23 is connected to ground. Control grid 40 is connected through a coupling capacitor 41 to anode 61 of vertical output stage 24, and grid 40 is also connected through a resistor 42 and a vertical hold potentiometer 43 to ground. Anode 25 of vertical oscillator stage 23 is connected to a resistor 26, the opposite terminal of which is connected to one terminal of a vertical size control potentiometer 27. The other terminal of potentiometer 27 and its movable arm 28 are connected together and through a resistor 30 to the positive terminal of a source of reference potential, conventionally designated $B_1+$.

Sync signal separator 17 is coupled to control grid 60 of vertical output stage 24, and through a coupling capacitor 31 to anode 25 of vertical oscillator 23. Anode 61 of vertical output stage 24 is connected to field-deflection coils 32 and to $B_2+$. Cathode 44 of vertical output stage 24 is connected through a vertical linearity potentiometer 45 and a resistor 46 to ground; a bypass capacitor 47 is connected between the movable arm of potentiometer 45 and ground.

Second anode 62 of cathode-ray tube 20 is connected through a resistor 63 to the positive terminal of a source of high unidirectional operating potential, which may be the high-voltage rectifier of a conventional television receiver. A filter capacitor 64 is connected between ground and the junction of second anode 62 and resistor 63.

Potentiometer 33 is connected in the brightness-control circuit, having one terminal connected to ground and the opposite terminal connected through a resistor 34 to $B_3+$. Movable arm 35 of potentiometer 33 is connected through a resistor 36 to cathode 37 of cathode-ray tube 20; in accordance with the invention, movable arm 35 is also connected through a resistor 38 to the junction of resistor 30 and potentiometer 27.

Figure 2 differs from Figure 1 in the circuitry utilized to connect the brightness-control circuit to the field-deflection system. In Figure 2 control grid 60 of vertical output stage 24 is connected to a resistor 51, the other terminal of which is connected to a resistor 52; the opposite terminal of resistor 52 is connected to ground. The junction of resistors 51 and 52 is connected through a resistor 53 to one end of resistor 36, the other end of which is connected to movable arm 35 of brightness-control potentiometer 33. The terminal of potentiometer 33 remote from ground is connected to $B_3+$.

In operation, a composite television signal is coupled to antenna 10 of the wave-signal receiver shown in Figure 1, and from antenna 10 through R.-F. amplifier 11, first detector 12, and I.-F. amplifier 13 to video detector 14. Intercarrier sound signals from video detector 14 are coupled to audio detector and amplifier 15, the output of which is reproduced in loudspeaker 18. Composite video signals from detector 14 are applied through video amplifier 16 to control grid 19, to modulate the electron beam of cathode-ray tube 20. The composite video signals from detector 14 are also coupled to sync signal separator 17. The line-frequency synchronizing signals are coupled from sync signal separator 17 to line-sweep system 21, the output of which is coupled to line-deflection coils 22.

Vertical oscillator 23 and vertical output stage 24 comprise a multivibrator circuit having its frequency controlled by the field-frequency synchronizing signals coupled from sync signal separator 17 to control grid 60 of vertical output stage 24, and through capacitor 31 to anode 25 of vertical oscillator 23. Potentiometer 27, the vertical size control, may be varied to alter the reference potential toward which anode 25 of vertical oscillator 23 rises during the multivibrator cycle. The output of the field-sweep multivibrator circuit is coupled from anode 61 of vertical output stage 24 to field-deflection coils 32.

The brightness of the image reproduced on the fluorescent screen of cathode-ray tube 20 is varied by moving arm 35 on brightness-control potentiometer 33. Movement of arm 35 simultaneously changes the resistance of the two variable resistance portions of potentiometer 33; the first portion lies between ground and arm 35, and the second portion between arm 35 and the junction of potentiometer 33 and resistor 34. As the position of movable arm 35 is varied, the bias voltage between grid 19 and cathode 37 of cathode-ray tube 20 is also varied. As arm 35 is moved away from ground potential, increasing the resistance of the first portion of potentiometer 33 and decreasing the resistance of the second, the negative bias voltage between control grid 19 and cathode 37 increases, the current flow from cathode 37 toward the fluorescent screen decreases, and fewer electrons impinge on final anode 62. The decreased current flow from second anode 62 through resistor 63 to the high-voltage source effects a smaller voltage drop across resistor 63, raising the potential of second anode 62. This increase in potential increases the velocity of the beam current, producing a faster or "harder" beam. The magnitudes of the sweep system fields at coils 22 and 32 remain substantially constant, and therefore have a reduced effect on the relatively faster beam causing a reduction in deflection of the electron beam. This reduced deflection decreases the size of the picture appearing on the screen of cathode-ray tube 20.

In accordance with the invention, resistor 38 is coupled between movable arm 35 of potentiometer 33 and the junction of resistor 30 and potentiometer 27. Vertical oscillator 23 derives the operating potential for anode 25 from this junction, through resistor 26 and potentiometer 27. The voltage appearing at this junction is largely dependent upon the current flow through a voltage divider comprising the first portion of potentiometer 33 (between ground and arm 35), resistor 38, and resistor 30. As movable arm 35 is moved away from ground potential, the value of the total resistance between $B_1+$ and ground is increased. This movement reduces the current flow from $B+_1$ to ground which causes a decreased voltage drop across resistor 30, thereby increasing the potential applied to anode 25 of vertical oscillator 23. This increased potential increases the drive of the field-sweep system, which in turn increases the vertical size of the picture. This increase can be adjusted, by properly sizing resistors 30 and 38, to compensate for the decrease caused by the rise in final anode voltage which accompanies a brightness decrease.

The operation of the circuit shown in Figure 2 differs from that portrayed in Figure 1 in that a bias voltage, rather than an anode supply potential, is controlled. In Figure 2, cathode 37 is coupled through resistor 53 to the junction of resistors 51 and 52, and variations in the picture tube cathode voltage appear at control grid 60 of vertical output stage 24. The current flow through potentiometer 33 remains substantially constant; as movable arm 35 is displaced along potentiometer 33, the potential coupled through resistor 36 to cathode 37 of cathode-ray tube 20 is varied. As movable arm 35 is displaced away from ground to decrease the brightness, a greater positive potential is coupled to cathode 37, and likewise to the junction of resistors 51 and 52. The voltage appearing at control grid 60 also goes more positive, thereby increasing the average plate current of vertical output stage 24 and compensating for the decreased vertical dimension of the picture. The corrective bias potential applied to control grid 60 is coupled through a voltage divider comprising the second portion of potentiometer 33 (between arm 35 and $B_3+$), resistor 36, resistor 53, and resistor 51.

The compensating circuit shown in Figure 1, like a vertical size control, affects principally the lower portion of the picture, and the circuit of Figure 2, like a vertical linearity control, affects principally the upper portion of the picture. When both corrective circuits are employed, the vertical dimension of the picture is proportionally controlled both at the top and bottom of the image. The correct values of resistors 52 and 53 (Figure 2) are determined empirically, being adjusted so that variations of the brightness control throughout its range do not affect the vertical size and linearity controls. If the circuits of Figures 1 and 2 are combined, in addition to resistors 52 and 53, resistors 30 and 38 of Figure 1 are also determined empirically so as not to affect the vertical size and linearity controls.

In present commercial television receivers using cathode-ray tubes employing wide-angle deflection of the electron beam, horizontal oversweep of the fluorescent screen is commonly employed. Hence, variations in picture size are more noticeable and objectionable in the vertical direction than in the horizontal. The invention provides an efficacious means for minimizing the vertical size fluctuations that occur as the brightness-control setting is changed. The correction is accomplished by coupling a voltage, proportional to the brightness-control setting, to the vertical deflection system to vary the drive of the system as the brightness-control varies. The circuitry utilized is simple and inexpensive, and the result is to substantially abolish vertical fluctuations in image size with brightness variations.

The following table of specific component designations is given by way of example only, and in no sense by way of limitation:

| | | |
|---|---|---|
| Vertical oscillator tube 23 | | 12AX7 |
| Vertical output tube 24 | | 6BX7 |
| Resistor 26 | megohm | 1 |
| Resistor 30 | ohms | 68,000 |
| Resistor 34 | do | 100,000 |
| Resistor 36 | do | 220,000 |
| Resistor 38 | do | 330,000 |
| Resistor 51 | megohms | 1.8 |
| Resistor 52 | ohms | 100,000 |

| | |
|---|---|
| Resistor 53 ---------- megohms | 1.2 |
| Capacitor 31 ---------- microfarad | .1 |
| Potentiometer 27 ---------- megohms | 7 |
| Potentiometer 33 ---------- ohms | 150,000 |
| $B_1+$ ---------- volts | 700 |
| $B_2+$ ---------- do | 700 |
| $B_3+$ ---------- do | 250 |

While particular embodiments of the invention have been shown and described, it is apparent that modifications and alterations may be made, and it is intended in the appended claims to cover all such modifications and alterations as may fall within the true spirit and scope of the invention.

We claim:

1. A television receiver comprising: a cathode-ray tube including a fluorescent screen, an electron gun for projecting an electron beam toward said fluorescent screen, means included in said electron gun for varyng the instantaneous intensity of said electron beam in accordance with an applied video signal, a deflection system responsive to an applied deflection signal for causing said electron beam to scan said fluorescent screen, and a final anode for determining the velocity of impact of said electron beam on said fluorescent screen, means including a series coupling impedance for impressing a predetermined positive operating potential on said final anode; a deflection-signal generator coupled to said deflection system for impressing thereon a deflection signal to cause said beam to scan said fluorescent screen in a co-ordinate direction with a predetermined nominal amplitude; means including a variable brightness-control circuit coupled to said electron gun for controlling the average intensity of said electron beam, variation of said brightness-control circuit resulting in corresponding variations in the voltage drop across said series coupling impedance and in the scanning amplitude of said electron beam in said co-ordinate direction; and means coupling said brightness-control circuit to said deflection-signal generator to vary said deflection-signal amplitude concomitantly with said voltage drop and maintain said scanning amplitude substantially constant with variation of said brightness-control circuit.

2. A television receiver comprising: a cathode-ray tube including a fluorescent screen, an electron gun for projecting an electron beam toward said fluorescent screen, means included in said electron gun for varyng the instantaneous intensity of said electron beam in accordance with an applied video signal, a deflection system responsive to an applied deflection signal for causing said electron beam to scan said fluorescent screen, and a final anode for determining the velocity of impact of said electron beam on said fluorescent screen, means including a series coupling impedance for impressing a predetermined positive operating potential on said final anode; a deflection-signal generator comprising an electron-discharge device having cathode, control and anode electrodes for generating a deflection signal of an amplitude dependent on the direct-current potential applied to one of said electrodes and coupled to said deflection system for impressing said deflection signal thereon to cause said beam to scan said fluorescent screen in a co-ordinate direction with a predetermined nominal amplitude; a variable brightness-control circuit comprising a variable potentiometer having two fixed terminals and a movable terminal, means for impressing a unidirectional operating potential difference between said fixed terminals, and conductive means coupling said movable terminal to said electron gun for controlling the average intensity of said electron beam, variation of said brightness-control circuit resulting in corresponding variations in the voltage drop across said series coupling impedance and in the scanning amplitude of said electron beam in said co-ordinate direction; a voltage divider comprising a variable portion of said potentiometer; means for impressing a unidirectional operating voltage across said voltage divider; and means coupling said one electrode to an intermediate point on said voltage divider to vary said deflection-signal amplitude concomitantly with said voltage drop and maintain said scanning amplitude substantially constant with variation of said brightness-control circuit.

3. A television receiver comprising: a cathode-ray tube including a fluorescent screen, an electron gun for projecting an electron beam toward said fluorescent screen, means included in said electron gun for varyng the instantaneous intensity of said electron beam in accordance with an applied video signal, a deflection system responsive to an applied deflection signal for causing said electron beam to scan said fluorescent screen, and a final anode for determining the velocity of impact of said electron beam on said fluorescent screen, means including a series coupling impedance for impressing a predetermined positive operating potential on said final anode; a deflection-signal generator comprising an electron-discharge device having cathode, control and anode electrodes for generating a deflection signal of an amplitude dependent on the direct-current potential applied to said anode electrode and coupled to said deflection system for impressing said deflection signal thereon to cause said beam to scan said fluorescent screen in a co-ordinate direction with a predetermined nominal amplitude; a variable brightness-control circuit comprising a variable potentiometer having two fixed terminals and a movable terminal with a first variable resistance portion between said movable terminal and one of said fixed terminals and a second variable resistance portion between said movable terminal and the other of said fixed terminals, means for impressing a unidirectional operating potential difference between said fixed terminals, and conductive means coupling said movable terminal to said electron gun for decreasing the average intensity of said electron beam as said movable terminal is adjusted to simultaneously increase the resistance of said first variable portion and decrease the resistance of said second variable portion, such adjustment of said movable terminal resulting in a corresponding decrease in the voltage drop across said series coupling impedance and in the scanning amplitude of said electron beam in said co-ordinate direction; a voltage divider comprising said first variable resistance portion of said potentiometer; means for impressing a unidirectional operating voltage across said voltage divider; and means coupling said anode electrode to an intermediate point on said voltage divider to increase said deflection-signal amplitude concomitantly with said decrease in voltage drop and maintain said scanning amplitude substantially constant with variation of said brightness-control circuit.

4. A television receiver comprising: a cathode-ray tube including a fluorescent screen, an electron gun for projecting an electron beam toward said fluorescent screen, means included in said electron gun for varying the instantaneous intensity of said electron beam in accordance with an applied video signal, a deflection system responsive to an applied deflection signal for causing said electron beam to scan said fluorescent screen, and a final anode for determining the velocity of impact of said electron beam on said fluorescent screen; means including a series coupling impedance for impressing a predetermined positive operating potential on said final anode; a deflection-signal generator comprising an electron-discharge device having cathode, control and anode electrodes for generating a deflection signal of an amplitude dependent on the direct-current potential applied to said anode electrode and coupled to said deflection system for impressing said deflection signal thereon to cause said beam to scan said fluorescent screen in a co-ordinate direction with a predetermined nominal amplitude; a variable brightness-control circuit comprising a variable potentiometer having two fixed terminals and a movable terminal with a first variable resistance portion between said movable terminal and one of said fixed terminals and a second variable resistance portion between said movable terminal and the other of said fixed terminals, means for impressing a unidirectional operating potential difference between said fixed terminals, and means including a first resistor coupling said movable terminal to said electron gun for decreasing the average intensity of said electron beam as said movable terminal is adjusted to simultaneously increase the resistance of said first variable portion and decrease the resistance of said second variable portion, such adjustment of said movable terminal resulting in a corresponding decrease in the voltage drop across said series coupling impedance and in the scanning amplitude of said electron beam in said co-ordinate direction; a voltage divider comprising said first variable resistance portion of said potentiometer, a second resistor connected to said movable terminal of said potentiometer, and a third resistor series-connected with said second resistor; means for impressing a unidirectional operating voltage across said voltage divider; and means coupling said anode electrode to a point intermediate said second and third resistors to increase said deflection-signal amplitude concomitantly with said decrease in voltage drop and maintain said scanning amplitude substantially constant with variation of said brightness-control circuit.

5. A television receiver comprising: a cathode-ray tube including a fluorescent screen, an electron gun for projecting an electron beam toward said fluorescent screen, means included in said electron gun for varying the instantaneous intensity of said electron beam in accordance with an applied video signal, a deflection system responsive to an applied deflection signal for causing said electron beam to scan said fluorescent screen, and a final anode for determining the velocity of impact of said electron beam on said fluorescent screen; means including a series coupling impedance for impressing a predetermined positive operating potential on said final anode; a deflection-signal generator comprising an electron-discharge device having cathode, control and anode electrodes for generating a deflection signal of an amplitude dependent on the direct-current potential applied to said control electrode and coupled to said deflection system for impressing said deflection signal thereon to cause said beam to scan said fluorescent screen in a co-ordinate direction with a predetermined nominal amplitude; a variable brightness-control circuit comprising a variable potentiometer having two fixed terminals and a movable terminal with a first variable resistance portion between said movable terminal and one of said fixed terminals and a second variable resistance portion between said movable terminal and the other of said fixed terminals, means for impressing a unidirectional operating potential difference between said fixed terminals, and conductive means coupling said movable terminal to said electron gun for decreasing the average intensity of said electron beam as said movable terminal is adjusted to simultaneously increase the resistance of said first variable portion and decrease the resistance of said second variable portion, such adjustment of said movable terminal resulting in a corresponding decrease in the voltage drop across said series coupling impedance and in the scanning amplitude of said electron beam in said co-ordinate direction; a voltage divider comprising said second variable resistance portion of said potentiometer; means for impressing a unidirectional operating voltage across said voltage divider; and means coupling said control electrode to an intermediate point on said voltage divider to increase said deflection-signal amplitude concomitantly with said decrease in voltage drop and maintain said scanning amplitude substantially constant with variation of said brightness-control circuit.

6. A television receiver comprising: a cathode-ray tube including a fluorescent screen, an electron gun for projecting an electron beam toward said fluorescent screen, means included in said electron gun for varying the instantaneous intensity of said electron beam in accordance with an applied video signal, a deflection system responsive to an applied deflection signal for causing said electron beam to scan said fluorescent screen, and a final anode for determining the velocity of impact of said electron beam on said fluorescent screen; means including a series coupling impedance for impressing a predetermined positive operating potential on said final anode; a deflection-signal generator comprising an electron-discharge device having cathode, control and anode electrodes for generating a deflection signal of an amplitude dependent on the direct-current potential applied to said control electrode and coupled to said deflection system for impressing said deflection signal thereon to cause said beam to scan said fluorescent screen in a co-ordinate direction with a predetermined nominal amplitude; a variable brightness-control circuit comprising a variable potentiometer having two fixed terminals and a movable terminal with a first variable resistance portion between said movable terminal and one of said fixed terminals and a second variable resistance portion between said movable terminal and the other of said fixed terminals, means for impressing a unidirectional operating potential difference between said fixed terminals, and means including a first resistor coupling said movable terminal to said electron gun for decreasing the average intensity of said electron beam as said movable terminal is adjusted to simultaneously increase the resistance of said first variable portion and decrease the resistance of said second variable portion, such adjustment of said movable terminal resulting in a corresponding decrease in the voltage drop across said series coupling impedance and in the scanning amplitude of said electron beam in said co-ordinate direction; a voltage divider comprising said second variable resistance portion of said potentiometer, said first resistor, a second resistor connected to a terminal of said first resistor remote from said movable terminal, and a third resistor series-connected with said second resistor; means for impressing a unidirectional operating voltage across said voltage divider; and means coupling said control electrode to the junction of said second and third resistors to increase said deflection-signal amplitude concomitantly with said decrease in voltage drop and maintain said scanning amplitude substantially constant with variation of said brightness-control circuit.

References Cited in the file of this patent

UNITED STATES PATENTS

| | | |
|---|---|---|
| 2,297,547 | Foster et al. | Sept. 29, 1942 |
| 2,302,876 | Mallinger | Nov. 24, 1942 |
| 2,411,963 | George | Dec. 3, 1946 |
| 2,418,133 | Miller et al. | Apr. 1, 1947 |
| 2,431,766 | Miller et al. | Dec. 2, 1947 |
| 2,448,299 | Dorne | Aug. 31, 1948 |
| 2,465,364 | Ferrar | Mar. 29, 1949 |
| 2,588,652 | Nelson | Mar. 11, 1952 |
| 2,588,659 | Pond | Mar. 11, 1952 |
| 2,656,486 | Giordano | Oct. 20, 1953 |